Patented May 19, 1936

2,041,223

UNITED STATES PATENT OFFICE 2,041,223

PLASTIC RUBBER COMPOSITION

Roland R. Bollman, Mount Washington, Ohio, assignor to The Perfect Manufacturing Company, Cincinnati, Ohio, a corporation of Ohio No Drawing. Original application April 22, 1932, Serial No. 606,914. Divided and this application January 10, 1933, Serial No. 651,061

3 Claims. (Cl. 106—23)

This invention relates to plastic rubber compositions adapted to be formed into desired structural shapes and hardened at room temperature as a result of the evaporation of a rubber solvent included in the plastic compositions.

It is also feasible, where desired, to use such a plastic containing sulphur in combination with an adhesive or coating composition, the latter containing a room temperature accelerator of vulcanization adapted to migrate into the body of plastic rubber and further harden it.

One of the difficulties of using plastic or other moldable rubber compositions adapted to harden by reason of the evaporation of rubber solvent, resides in the fact that such evaporation results in shrankage of the plastic, thereby modifying its structural form to a degree which cannot be adequately anticipiated by an unskilled user of the plastic material. For instance: Plastic compositions of this type are adapted to be used for repairing all types of rubber and leather articles, such as shoes, rain-coats, tires, baseball gloves, and likewise articles such as tents, linoleum, automobile tops, etc. Now, if a new shoe sole be fabricated from a rubber composition which shrinks as it hardens, it is impossible for the person constituting the new sole to have the finished sole of exactly the desired thickness.

In repairing shoe soles with rubber plastics in the past, it has been conventional first to roughen the shoe sole, then coat it with an adhesive rubber cement, then mold the plastic rubber composition over the layer of tacky cement. Moreover, according to the application of Bollman and Ornes, Serial No. 565,922, it is desirable to employ sulphur in the plastic composition and a room temperature vulcanization accelerator in the rubber cement whereby migration of the accelerator results in vulcanization of the finished sole.

The present invention is directed to a rubber plastic composition adapted to be used for the purposes and in the processes hereinbefore specified, plastic characterized by a smaller amount of shrinkage upon drying and hardening than plastic rubber compositions heretofore used. In these former plastic rubber compositions a certain amount of inert filler and fibre have been employed, and of course, the greater the percentage of such material, the smaller is the percentage of shrinking of the plastic composition. However, it is impossible to go beyond a certain percentage of such material without sacrificing plastic qualities, resiliency, and wearing qualities of the composition.

The present invention involves the use of a substantial quantity of finely divided vulcanized rubber, such as finely ground rubber truck tires, as a filler in a non-shrinking, resilient composition of the type described. In order to have such material operate as a filler, it is desirable first to admix the other ingredients including the rubber and rubber solvent until a semi-plastic mass is developed. Afterward, the ground truck tire is added and tends to increase the resiliency of the product resulting from the plastic composition, to increase its wearing properties and at the same time to decrease materially the degree of shrinkage attendant to the hardening.

Otherwise expressed, it may be said that the new rubber dissolved in solvent is used as an adhesive to bind the filler and fibre and the ground truck tire together, the ground truck tire serving to absorb only what ever excess of solvent may be present.

The plastic so constituted is preferably stiff, dough-like, untacky, and adapted to be rolled into a repair layer which may be readily cut and handled. In short, the product is more like a solid than a liquid.

One use of this invention will be illustrated by an example of repairing worn shoe soles: First, the plastic composition is rolled out by means of a rolling pin, mason jar or the like, to form a layer of about one-fourth inch in thickness; next, the shoe sole to be repaired is placed upon it, and a piece trimmed out of the plastic just the size of the shoe sole being repaired; next, the shoe sole is scraped and a coating of rubber cement applied both to it and to the new sole blank. When the rubber cement becomes tacky, the sole blank cut from the plastic composition is applied to the coat of tacky cement, the plastic composition pressed firmly onto the shoe sole and then permitted to dry over a period of about forty-eight hours. In a compositon of the type described, the shrinkage of the sole during the forty-eight hours of drying is very slight and in no way objectionable.

One plastic composition responsive to this invention is as follows:

| | |
|---|---|
| Rubber crude | 120 lbs. |
| Benzol or gasoline or naphtha | 78 gals. |
| Asbestos fibre | 200 lbs. |
| Portland cement | 200 lbs. |
| Toughener carbon black | 12 lbs. |
| Rosin | 10 lbs. |
| Stearic acid | 3 lbs. |
| Sulphur, 10% of rubber | 14 lbs. |
| Zinc oxide | 14 lbs. |

After the crude rubber is completely dissolved, two gallons of denatured alcohol is added. Next, one-hundred fifty-five pounds of finely ground truck tires is thoroughly mixed with the above described formula.

The advance accomplished by the present invention, however, comprises the improvement of the plastic composition, particularly the reduction in shrinkage by the addition of the finely ground truck tire or the like to the composition including rubber dissolved in rubber solvent.

This application is divisional of my application Serial No. 606,914 filed April 22, 1932.

Having described my invention, I desire to be limited only by the following claims.

I claim:

1. A plastic, dough-like, untacky composition adapted to use in repairing worn shoe soles, hardenable without shrinkage into a resilient, tough composition, comprising, dominant quantities of asbestos fibre and cement, and including crude rubber, suitable solvent therefor, finely ground truck tire, carbon black toughener, rosin, stearic acid, and vulcanizing agents, all intermixed to provide an untacky, plastic mass suitable for preformation to approximate size before application of the material to the shoe sole.

2. A plastic composition adapted to harden upon standing without appreciable shrinkage, comprising, a cement made from the crude rubber and suitable solvent therefor, dominant quantities of non-shrinkable filler, such as asbestos and Portland cement, finely ground truck tire, sulphur, zinc oxide, and a rubber toughener such as carbon black, said crude rubber cement adapted to bind the filler and the fibre and the vulcanized rubber particles together into a stiff, dough-like, untacky but moldable plastic mass at room temperature susceptible to application to a worn shoe sole in conjunction with a suitable adhesive.

3. A stiff, dough-like, untacky, plastic composition suitable for repairing worn shoe soles and capable of being molded and approximately sized as to shape before application to said shoe sole, comprising, 120 pounds of crude rubber, 78 gallons of crude rubber solvent, 200 pounds of asbestos fibre, 200 pounds of Portland cement, 12 pounds of carbon black toughener, 10 pounds rosin, 3 pounds stearic acid, 14 pounds sulphur, 14 pounds zinc oxide, 2 gallons denatured alcohol, and 155 pounds of finely ground truck tire, all of which ingredients are intermixed to form a composition which does not shrink upon hardening.

ROLAND R. BOLLMAN.